US012049553B2

(12) United States Patent
Tateishi (10) Patent No.: US 12,049,553 B2
(45) Date of Patent: Jul. 30, 2024

(54) MIDSOLE AND SHOE (71) Applicant: ASICS CORPORATION, Kobe (JP)

(72) Inventor: Junichiro Tateishi, Kobe (JP)

(73) Assignee: ASICS CORPORATION, Kobe (JP)

( * ) Notice: Subject to any disclaimer, the term of this patent is extended or adjusted under 35 U.S.C. 154(b) by 924 days.

(21) Appl. No.: 17/056,403

(22) PCT Filed: May 18, 2018

(86) PCT No.: PCT/JP2018/019349
§ 371 (c)(1),
(2) Date: Nov. 17, 2020

(87) PCT Pub. No.: WO2019/220633
PCT Pub. Date: Nov. 21, 2019

(65) Prior Publication Data
US 2021/0214536 A1 Jul. 15, 2021

(51) Int. Cl.
*C08L 23/06* (2006.01)
*A43B 13/04* (2006.01)
*A43B 13/18* (2006.01)
*C08L 23/08* (2006.01)
*C08L 31/04* (2006.01)

(52) U.S. Cl.
CPC .............. *C08L 23/06* (2013.01); *A43B 13/04* (2013.01); *A43B 13/187* (2013.01); *C08L 23/08* (2013.01); *C08L 31/04* (2013.01); *C08L 2205/025* (2013.01); *C08L 2205/035* (2013.01); *C08L 2207/04* (2013.01); *C08L 2207/062* (2013.01); *C08L 2207/066* (2013.01)

(58) Field of Classification Search
CPC .... C08L 23/06; C08L 31/04; C08L 2205/025; C08L 2205/035; C08L 2207/04; C08L 2207/062; C08L 2207/066; A43B 13/04; A43B 13/187
USPC ......................................................... 521/140
See application file for complete search history.

(56) References Cited

U.S. PATENT DOCUMENTS

| | | | |
|---|---|---|---|
| 2011/0178195 A1* | 7/2011 | Cheng | ........................ C08J 9/02 521/134 |
| 2014/0259788 A1* | 9/2014 | Dojan | .................. A43B 13/125 36/103 |
| 2016/0113353 A1 | 4/2016 | Tateishi | |
| 2017/0340054 A1 | 11/2017 | Dirsa et al. | |

(Continued)

FOREIGN PATENT DOCUMENTS

| | | |
|---|---|---|
| CN | 107815055 A | 3/2018 |
| JP | 2015080899 A | 4/2015 |

(Continued)

OTHER PUBLICATIONS

The extended European search report issued by the European Patent Office on Apr. 28, 2021, which corresponds to European Patent Application No. 18919294.1-1005 and is related to U.S. Appl. No. 17/056,403.

(Continued)

*Primary Examiner* — Michael M. Bernshteyn
(74) *Attorney, Agent, or Firm* — Studebaker & Brackett PC (57) ABSTRACT

The present invention provides a midsole formed of a crosslinked polyolefin resin foam product including a reinforcing material and a softener so that the midsole is excellent in lightweight properties and strength.

20 Claims, 3 Drawing Sheets

(56) References Cited

U.S. PATENT DOCUMENTS

| | | |
|---|---|---|
| 2017/0340058 A1 | 11/2017 | Madore |
| 2019/0203412 A1 | 7/2019 | Watanabe et al. |
| 2020/0305548 A1 | 10/2020 | Tateishi |
| 2020/0317867 A1 | 10/2020 | Hara et al. |

FOREIGN PATENT DOCUMENTS

| | | | | |
|---|---|---|---|---|
| JP | 2015080899 A | * | 4/2015 | |
| JP | 2017078243 A | * | 4/2017 | |
| JP | 2017078243 A | | 4/2017 | |
| JP | 2018043525 A | * | 3/2018 | ........... B29C 64/118 |
| JP | 2018043525 A | | 3/2018 | |
| JP | 2018069141 A | * | 5/2018 | |
| JP | 2018069141 A | | 5/2018 | |
| JP | 2018069522 A | * | 5/2018 | |
| JP | 2018069522 A | | 5/2018 | |
| WO | 2010040019 A2 | | 4/2010 | |
| WO | WO-2010040019 A2 | * | 4/2010 | ............ C08J 9/0061 |
| WO | 2014151379 A2 | | 9/2014 | |
| WO | WO-2014151379 A2 | * | 9/2014 | ........... A43B 1/0018 |
| WO | 2014178137 A1 | | 11/2014 | |
| WO | 2018051395 A1 | | 3/2018 | |
| WO | WO-2018051395 A1 | * | 3/2018 | ............. D07B 1/005 |

OTHER PUBLICATIONS

Notification of Transmittal of Translation of the International Preliminary Report on Patentability (Chapter I) and Translation of Written Opinion of the International Searching Authority; PCT/JP2018/019349; mailed on Nov. 24, 2020.

An Examination Report mailed by the Australian Patent Office on Feb. 12, 2024, which corresponds to Australian Patent Application No. 2018423557 and is related to U.S. Appl. No. 17/056,403.

* cited by examiner

MIDSOLE AND SHOE

FIELD

The present invention relates to a shoe and a midsole thereof.

BACKGROUND

Conventionally, foam products formed by foaming a composition whose main component is a polymer such as resins and rubbers are used for various applications because of their excellent cushioning properties, and are widely used also for sporting goods. Sports shoes used for various competitions are composed of various members. For example, a shoe sole is composed of shoe sole members such as an outsole, a midsole, and an inner sole. Among such shoe sole members, the midsole is required to exhibit high strength to thereby exhibit excellent durability while having a high expansion ratio, and is therefore composed of a crosslinked resin foam product including a crosslinked resin as a main component. In this regard, for example, Patent Literature 1 below discloses a midsole composed of a crosslinked resin foam product with fibers dispersed therein. Patent Literature 1 below further discloses that the midsole including fibers exhibits excellent recovering properties from compressive deformation.

CITATION LIST

Patent Literature

Patent Literature 1: WO 2014/178137 A

SUMMARY

Technical Problem

The crosslinked resin foam product in Patent Literature 1 has such a function as to cause the fibers to generate bending stress when bubbles inside the crosslinked resin foam product are subjected to compressive deformation, and as to recover the bubbles to their original forms using the recovering force against the bending stress. The fibers dispersed in this crosslinked resin foam product need to be reasonably longer than the size of the bubbles to generate the bending stress due to the deformation of the bubbles. Therefore, in the invention disclosed in Patent Literature 1, fibers having an average length of 0.5 mm to 10 mm are used.

Several-millimeter-long fibers are considered to be effective for increasing the overall strength of the crosslinked resin foam product, but are not expected to have sufficient reinforcing action on resin films constituting the individual bubbles in the crosslinked resin foam product. The reinforced films can maintain their strength even if the bubble films are thinned to cause the crosslinked resin foam product to exhibit lightweight properties. That is, the films that can be reinforced are considered to enable the crosslinked resin foam product to exhibit lightweight properties demanded for a midsole. It is therefore an object of the present invention to provide a crosslinked resin foam product having such a new function, and provide a midsole excellent in lightweight properties and strength.

Solution to Problem

To solve the above problem, the present invention provides a midsole for a shoe, the midsole composed of a crosslinked polyolefin resin foam product, wherein the crosslinked polyolefin resin foam product includes one or more high melting point polyolefin resins having a melting point of more than 75° C. and further includes a softener and a reinforcing material, the softener includes a crystalline resin having a melting point of 40° C. or more and 75° C. or less or an amorphous resin having a glass-transition temperature of 40° C. or more and 75° C. or less, and the reinforcing material includes cellulose nanofibers or carbon nanofibers.

DESCRIPTION OF EMBODIMENTS

Figure 1:
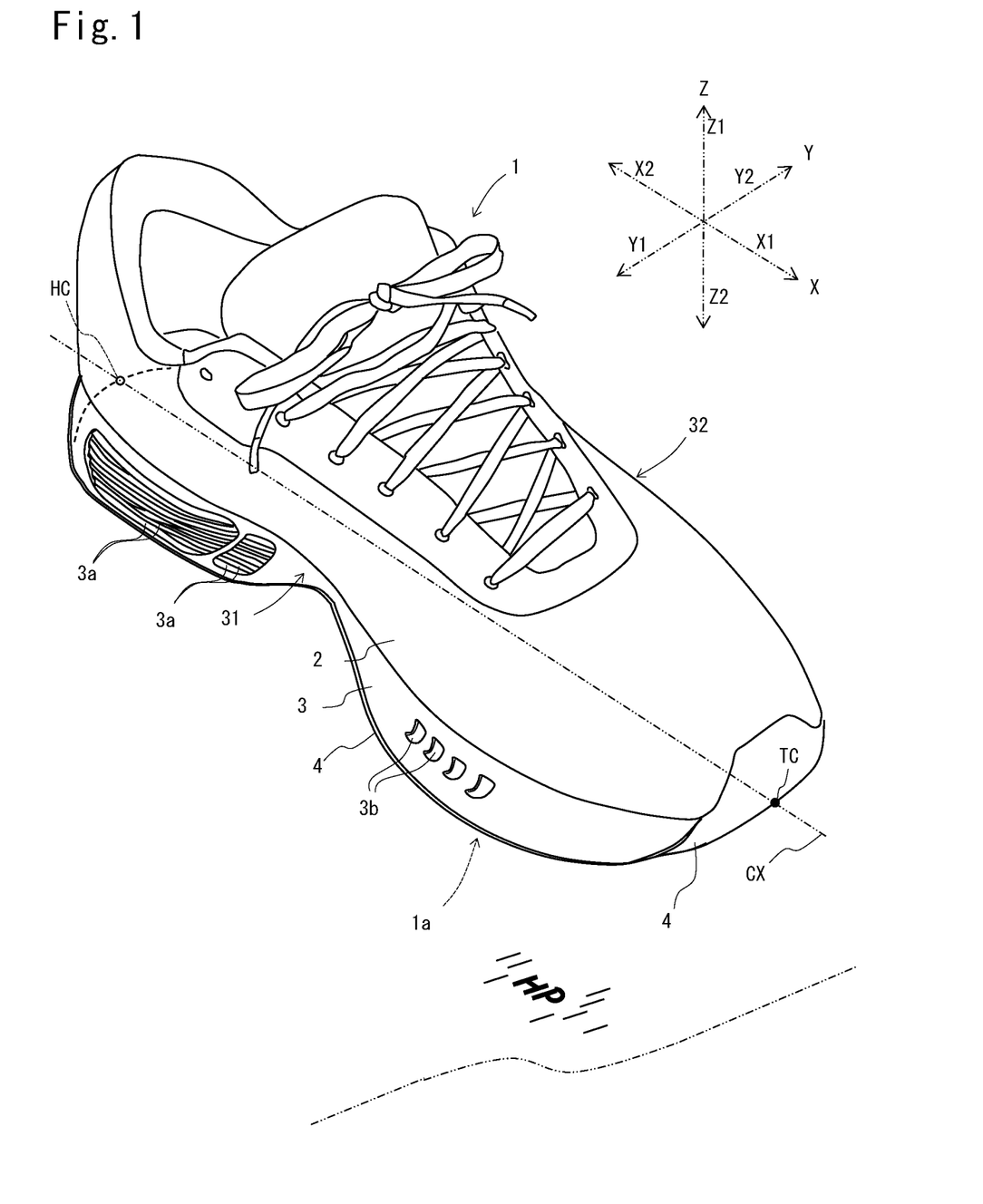
FIG. 1 is a schematic perspective view showing a shoe including a midsole of one form.

A shoe sole member of the present invention will be hereinafter described by referring to an embodiment thereof. FIG. 1 shows a shoe formed using shoe sole members of this embodiment. A shoe 1 includes an upper 2 and shoe sole members 3 and 4. The shoe 1 includes a midsole 3 and an outsole 4 as the shoe sole members. Hereinafter, when a description is given on, for example, the shoe 1 shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Among directions orthogonal to the shoe center axis CX, a direction parallel to a horizontal plane HP may be referred to as, for example, a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

As shown in FIG. 1, the shoe 1 of this embodiment includes the outsole 4 in its bottommost position. The outsole 4 constitutes the ground engaging surface of the shoe 1. The shoe 1 includes the midsole 3 between the outsole 4 and the upper 2 that covers a foot of a wearer from the upper side. The midsole 3 of this embodiment has a flat shape, and is arranged so that the thickness direction thereof corresponds to the height direction Z of the shoe. The lower surface of the midsole 3 is in contact with the upper surface of the outsole 4, and the upper surface of the midsole 3 is in contact with the upper 2 from below. Side portions 31 and 32 of the midsole are in an exposed state without being covered with, for example, the upper 2 or the outsole 4. That is, the midsole 3 of this embodiment includes the side portions 31 and 32 that constitute an outer surface of the shoe 1.

As shown in FIG. 1, the midsole 3 of this embodiment has a plurality of projections and a plurality of recesses in the medial side portion 31. The side portion 31 of the midsole 3 of this embodiment has a plurality of linear projections 3a on the heel side of the shoe 1. The plurality of linear projections 3a respectively extend along the length direction X of the shoe, and are arranged in parallel to each other to form a hairline shape in the side 30 portion 31. The side portion 31 of the midsole 3 of this embodiment has a plurality of rectangular recesses 3b on the toe side of the shoe 1. In the midsole 3 of this embodiment, these linear projections 3a and the rectangular recesses 3b form a part of the design of the shoe 1.

Although not shown in the figures, the lateral side portion 32 of the midsole 3 also has projections and recesses similar to those in the medial side portion. These projections and recesses are formed in the course of producing the midsole 3, for which a method will be later described in detail.

It is preferable that the midsole 3 of this embodiment have a specific gravity of 0.2 or less in order to cause the shoe 1 to exhibit excellent lightweight properties. The specific gravity of the midsole 3 is more preferably 0.15 or less. In order to cause the midsole 3 to exhibit excellent strength, the specific gravity is preferably 0.05 or more, more preferably 0.07 or more. The specific gravity of the midsole means a value measured by the method A "Underwater displacement" of JIS K 7112 under a temperature condition of 23° C. The specific gravity can be measured using a hydrometer having a mechanism to prevent floating of samples, and can be measured, for example, using a commercially available hydrometer from Alfa Mirage Co., Ltd., as a high-precision electronic hydrometer.

The midsole 3 of this embodiment preferably has an Asker C hardness of 80 or less to exhibit excellent cushioning properties. The Asker C hardness is more preferably 70 or less. In order to cause the midsole 3 to exhibit appropriate rebound resilience, the Asker C hardness of the midsole 3 is preferably 10 or more, more preferably 20 or more. The Asker C hardness means an instantaneous value obtained by conducting a spring hardness test by the type C of JIS K7312 at 23° C.

In this embodiment, the midsole 3 having a lower elastic modulus is more excellent in cushioning properties. The midsole 3 of this embodiment, if having an excessively low elastic modulus, may fail to sufficiently absorb impact force received by the foot of the wearer from the ground during walking. Therefore, the elastic modulus (compressive elastic modulus) of the midsole is preferably 0.1 MPa or more, more preferably 0.5 MPa or more, particularly preferably 1.0 MPa or more, still further preferably 1.5 MPa or more. The elastic modulus (compressive elastic modulus) of the midsole is preferably 20 MPa or less, more preferably 12 MPa or less, particularly preferably 8 MPa or less, still further preferably 4 MPa or less.

The elastic modulus of the midsole can be determined from the "stress-strain curve" obtained when the midsole is compressed at a strain rate of $0.01s^{-1}$. More specifically, the elastic modulus of the midsole can be determined from the gradient of the "stress-strain curve" of a minutely deformed area obtained when a cylindrical sample having a diameter of about 10 mm and a height of about 10 mm is prepared and the sample is compressed at a strain rate of $0.01s^{-1}$. The gradient of the curve of the minutely deformed area can be determined, for example, as the gradient of a straight line connecting a point of the "stress-strain curve" at 0.5% compression and a point thereof at 1.5% compression.

The midsole 3 has a compression set in the thickness direction of preferably 70% or less to prolong the life of the shoe 1. The compression set is more preferably 65% or less. It is not easy to cause the midsole 3 to have no compression set, and the compression set is usually 1% or more. The compression set herein means a value measured based on the method A in ASTM D395 (constant load test), and is a value obtained by applying a pressure of 0.59 MPa to a measurement sample for 22 hours under a temperature condition of 23° C., and measuring the thickness of the measurement sample after a lapse of 24 hours after the measurement sample is released from the pressure.

The midsole 3 of this embodiment is composed of a crosslinked polyolefin resin foam product in terms of easily exhibiting the abovementioned characteristics. The crosslinked polyolefin resin foam product of this embodiment is made of a certain material to cause the midsole 3 to exhibit excellent strength and to allow the midsole 3 to easily have a desired shape. Specifically, the crosslinked polyolefin resin foam product includes one or more high melting point resins having a melting point of more than 75° C., and further includes a softener and a reinforcing material.

The high melting point polyolefin resin is a main component of the crosslinked polyolefin resin foam product, and greatly affects the characteristics of the crosslinked polyolefin resin foam product. The softener exhibits a function contrary to that of the reinforcing material in terms simply of the strength of the crosslinked polyolefin resin foam product only, but is in this embodiment used to allow the shape of the detail of the midsole 3, such as the linear projections 3a, to easily have certain conditions. In order to more remarkably exhibit such a function, the softener in this embodiment includes a crystalline resin having a melting point of 40° C. or more and 75° C. or less or an amorphous resin having a glass transition temperature of 40° C. or more and 75° C. or less.

The reinforcing material in this embodiment is effective for increasing the tensile strength and the compressive strength of the crosslinked polyolefin resin foam product. The reinforcing material of this embodiment includes cellulose nanofibers or carbon nanofibers.

The crosslinked polyolefin resin foam product of this embodiment preferably includes two or more high melting point polyolefin resins, more preferably includes three or more high melting point polyolefin resins. In this embodiment, the crosslinked polyolefin resin foam product includes three high melting point polyolefin resins, namely: a first high melting point polyolefin resin, a second high melting point polyolefin resin, and a third high melting point polyolefin resin. Among these three high melt point polyolefin resins, the crosslinked polyolefin resin foam product includes the first high melting point polyolefin resin at the highest mass ratio, followed by the second high melting point polyolefin resin. Accordingly, among the three high melting point polyolefin resins, the third high melting point polyolefin resin accounts for the smallest content.

Examples of the first high melting polyolefin resin, the second high melting polyolefin resin, and the third high melting polyolefin resin include any of polyethylene, polypropylene, ethylene-propylene copolymer, propylene-1-hexene copolymer, propylene-4-methyl-1-pentene copolymer, propylene-1-butene copolymer, ethylene-1-butene copolymer, ethylene-1-hexene copolymer, ethylene-1-octene copolymer, ethylene-4-methyl-pentene copolymer, 1-butene-1-hexene copolymer, 1-butene-4-methyl-pentene, ethylene-methacrylate copolymer, ethylene-methacrylate methyl copolymer, ethylene-methacrylate ethyl copolymer, ethylene methacrylate butyl copolymer, ethylene-methyl acrylate copolymer, ethylene-ethyl acrylate copolymer, ethylene-butyl acrylate copolymer, propylene-methacrylate copolymer, propylene-methacrylate methyl copolymer, propylene-methacrylate ethyl copolymer, propylene-methacrylate butyl copolymer, propylene-methyl acrylate copolymer, propylene-ethyl acrylate copolymer, propylene-butyl acrylate copolymer, ethylene-vinyl acetate copolymer, and propylene-vinyl acetate copolymer.

In the case where the first high melting point polyolefin resin, the second high melting point polyolefin resin, and the third high melting point polyolefin resin are polyethylene, these may be, for example, any of a high density polyethylene having a density of 0.94 g/cm$^3$ or more, a medium density polyethylene having a density of 0.925 g/cm$^3$ or more and less than 0.94 g/cm$^3$, a low density polyethylene having a density of 0.91 g/cm$^3$ or more and less than 0.925 g/cm$^3$, and an ultralow density polyethylene having a density of 0.9 g/cm$^3$ or more and less than 0.91 g/cm$^3$. In the case where the first high melting point polyolefin resin, the second high melting point polyolefin resin, and the third high melting point polyolefin resin are, for example, a low density polyethylene, they may be a long-chain branched low density polyethylene (PE-LD) produced by the high pressure method, or a short-chain branched linear low density polyethylene (PE-LLD) produced by the catalyst method.

In the case where the first high melting point polyolefin resin, the second high melting point polyolefin resin, and the third high melting point polyolefin resin are, for example, polypropylene, these may be, for example, any of a homopolymer of propylene (homopolypropylene), a block copolymer of propylene and ethylene (block polypropylene), and a random copolymer of propylene and ethylene (random polypropylene).

The first high melting point polyolefin resin in this embodiment is included in the crosslinked polyolefin resin foam product in the largest amount among the three high melting point polyolefin resins, as aforementioned, and thus strongly affects the characteristics of the crosslinked polyolefin resin foam product. The first high melting point polyolefin resin is preferably an ethylene-α olefin copolymer such as ethylne-1-butene copolymer, ethylene-1-hexene copolymer, and ethylene-1-octene copolymer, in terms of allowing the midsole 3 to easily have good cushioning properties, and in terms of achieving good workability in forming the midsole 3 into a certain shape. The first high melting point polyolefin resin preferably has a melting point of 95° C. or more and 105° C. or less.

The second high melting point polyolefin resin, which is included in the crosslinked polyolefin resin foam product in the second largest amount after the first high melting point polyolefin resin, is preferably ethylene-vinyl acetate in terms of having excellent crosslinking efficiency and in terms of allowing the midsole 3 to have excellent adhesiveness to other members (such as the upper material 2 and the outsole 4). The content of vinyl acetate in the ethylene-vinyl acetate copolymer is preferably 10 mass % or more, more preferably 12 mass % or more. The content of vinyl acetate in the ethylene-vinyl acetate copolymer is preferably 20 mass % or less. The ethylene-vinyl acetate copolymer preferably has a melting point of 82° C. or more and 92° C. or less.

The third high melting point polyolefin resin is preferably a linear low density polyethylene. The linear low density polyethylene preferably has a melting point of 105° C. or more and 125° C. or less.

The melting point of the first high melting point polyolefin resin is preferably within +20° C. of both the melting point of the second high melting point polyolefin resin and the melting point of the third high melting point polyolefin resin. That is, in the case where the crosslinked polyolefin resin foam product constituting the midsole 3 includes a plurality of high melting point polyolefin resins, it is preferable that these high melting point polyolefin resins be selected so that the maximum difference between their melting points is 40° C. or less.

The total content of the high melting point polyolefin resins in the crosslinked polyolefin resin foam product is preferably 65 mass % or more and 95 mass % or less. The content of the first high melting point polyolefin resin in the crosslinked polyolefin resin foam product is preferably 25 mass % or more and 55 mass % or less. The content of the second high melting point polyolefin resin in the crosslinked polyolefin resin foam product is preferably 5 mass % or more and 35 mass % or less. The content of the third high melting point polyolefin resin in the crosslinked polyolefin resin foam product is preferably 1 mass % or more and 25 mass % or less.

The mass ratio of the content (M2) of the second high melting point polyolefin resin to the content (M1) of the first high melting point polyolefin resin (M2/M1×100%) is preferably 50 mass % or more and 90 mass % or less. The mass ratio of the content (M3) of the third high melting point polyolefin resin to the content (M1) of the first high melting point polyolefin resin (M3/M1×100%) is preferably 45 mass % or more and 80 mass % or less.

The softener in this embodiment is a component for obtaining a crosslinked polyolefin resin foam product that has a lower elastic modulus than that of a crosslinked polyolefin resin foam product formed only of the aforementioned high melting point polyolefin resins. In the case where the degree of the effect of the softener needs to be confirmed in advance, for example, non-foamed plate-shaped samples (for example with a thickness of 0.5 mm) formed respectively of a mixture resin including the softener and the high melting point polyolefin resins and of the high melting point polyolefin resins alone may be prepared to conduct a comparative test using the plate-shaped samples. Examples of the comparative test include a test using a viscoelastic spectrometer. More specifically, the effect of the softener can be confirmed for example by measuring the tensile modulus at normal temperature (for example 23° C.).

The softener is an effective component also for achieving good workability in shaping the midsole 3. The softener in this embodiment may include only the crystalline resin, and may include only the amorphous resin. The softener in this embodiment may include both the crystalline resin and the amorphous resin. It is preferable that the softener in this embodiment include a low melting point polyolefin resin having a melting point of 40° C. or more and 75° C. or less in terms of being excellent in compatibility with the high melting point polyolefin resin. The melting point of the low melting point polyolefin resin is preferably more than 45° C. The melting point of the low melting point polyolefin resin is preferably less than 70° C.

It is preferable that there be a difference of 30° C. or more in melting point between the low melting point polyolefin resin and any one of the high melting point polyolefin resins. Furthermore, it is preferable that the difference in melting point between the low melting point polyolefin resin and any one of the high melting point polyolefin resins be less than 30° C. That is, it is preferable that the difference in melting point between the low melting point polyolefin resin and one of the plurality of high melting point polyolefin resins be 30° C. or more, and that the difference in melting point between the low melting point polyolefin resin and another one of the plurality of high melting point polyolefin resins be less than 30° C. The mass ratio of the low melting point polyolefin resin to the total of the low melting point polyolefin resin and the high melting point polyolefin resins is preferably 5 mass % or more, more preferably 10 mass % or more. The mass ratio of the low melting point polyolefin resin to the total of the low melting point polyolefin resin and the high melting point polyolefin resins is preferably 5 mass % or more and preferably 40 mass % or less, more preferably 30 mass % or less.

The ratio of the low melting point polyolefin resin to the softener is preferably 80 mass % or more, more preferably 90 mass % or more.

The low melting point polyolefin resin is preferably any one of ethylene-α olefin copolymer and ethylene-vinyl acetate copolymer, in order to exhibit excellent compatibility with the high melting point polyolefin resins and exhibit excellent plasticizing effect for the high melting point polyolefin resins in a heated state. The crosslinked polyolefin resin foam product may include two or more low melting point polyolefin resins. Further, the softener may include an amorphous resin having a glass transition temperature of 40° C. or more and 75° C. or less, along with the low melting point polyolefin resin. Examples of the amorphous resin having a glass transition temperature of 40° C. or more and 75° C. or less include a styrene-based resin and an acrylic resin.

The low melting point polyolefin resin has a melt flow rate (MFR) of preferably 0.5 g/10 mins or more, more preferably 0.6 g/10 mins or more, further preferably 0.7 g/10 mins or more, which is measured at a temperature of 190° C. and a nominal load of 2.16 kg. The MFR of the low melting point polyolefin resin is preferably 4 g/10 mins or less. The MFR of the low melting point polyolefin resin can be, for example, measured according to b) Method for measuring time for which a piston moves a certain distance, which is described in Method B of JIS K 7210: 1999 "Plastics—Determination of the melt mass-flow rate (MFR) and the melt volume-flow rate (MVR) of thermoplastics". In the case where the softener is composed of a plurality of kinds of resins, it is preferable that the melt flow rate of a mixture of the plurality of kinds of resins also fall within the above range. The MFR of the low melting point polyolefin resin is preferably lower than the MFR of each of the high melting point resins. The MFR of the low melting point polyolefin resin is preferably 0.1 times or more and 0.7 times or less based on the MFR of the high melting point resin included in the largest amount in the crosslinked polyolefin resin foam product. The MFR of the high melting point resin (at 190° C. and 2.16 kg) is preferably 1 g/10 mins or more, more preferably 1.2 g/10 mins or more. The MFR of the high melting point resin (at 190° C. and 2.16 kg) is preferably 6 g/10 mins or less, more preferably 5.5 g/10 mins or less.

The "melting point" and the "glass transition temperature" in this embodiment can be measured based on JIS K 7121-1987 "Testing Methods for Transition Temperatures of Plastics". More specifically, the "melting point" and the "glass transition temperature" can be determined using, for example, heat flux differential scanning calorimetry (heat flux DSC), in which the measurement is performed with a sample volume of about 5 mg using alumina as a reference at a heating rate of 10° C./min while nitrogen purge is performed. The melting point can be obtained by measuring the temperature of the melting peak in the DSC chart. The glass transition temperature can be obtained by measuring the midpoint glass transition temperature in the DSC chart. In the case where a plurality of melting peaks and a plurality of glass transitions are observed in the DSC chart, the "melting point" and the "glass transition temperature" herein refer to values respectively obtained for the melting peak and the glass transition that are present in the respective temperature ranges in which the respective resins are actually in a molten state.

The crosslinked polyolefin resin foam product may further include, as the softener, for example, a fatty acid such as lauric acid, myristic acid, palmitic acid, stearic acid, or oleic acid, or an organic compound derived from the fatty acid. Examples of the organic compound derived from the fatty acid include: a fatty acid salt such as fatty acid lithium salt, fatty acid sodium salt, fatty acid potassium salt, or fatty acid calcium salt; a fatty acid ester such as glycerol fatty acid ester, polyglycerol fatty acid ester, sorbitan fatty acid ester, propylene glycol fatty acid ester, or sucrose fatty acid ester; and a fatty acid amide such as monofatty acid amide, bis-fatty acid amide, or N,N'-dialkyl fatty acid amide. These fatty acids and organic compounds derived from the fatty acids may be in a wax state or in a liquid state at normal temperature. In the case where the fatty acid and the organic compound derived from the fatty acid are included in the softener, the total content of the fatty acid and the organic compound derived from the fatty acid in the softener is preferably 1 mass % or more and 10 mass % or less. That is, in this embodiment, it is preferable that 90 mass % or more of the softener be a crystalline resin having a melting point of 40° C. or more and 75° C. or less, or an amorphous resin having the glass transition temperature of 40° C. or more and 75° C. or less.

The reinforcing material in this embodiment may include only the cellulose nanofibers, or may include only the carbon nanofibers. The reinforcing material in this embodiment may include both the cellulose nanofibers and the carbon nanofibers.

The cellulose nanofibers included in the crosslinked polyolefin resin foam product employed as the reinforcing material can be, for example, those derived from plants, animals, algae, microorganisms, microorganism products, or the like. The reinforcing material may include one kind of cellulose nanofibers, or include two or more kinds thereof. It is preferable that the raw material of the cellulose nanofibers be a plant. The plant as the raw material of the cellulose nanofibers may be a plant itself, a processed product obtained by processing a plant, or waste or the like that is no longer necessary. More specifically, examples of the plant that serves as the raw material of the cellulose nanofibers include wood, bamboo, hemp, jute, kenaf, pulp (e.g., needle unbleached kraft pulp (NUKP), needle bleached kraft pulp (NBKP), leaf unbleached kraft pulp (LUKP), leaf bleached kraft pulp (LBKP), needle unbleached sulfite pulp (NUSP), needle bleached sulfite pulp (NBSP), thermomechanical pulp (TMP), recycled pulp, waste paper), and yarns, fabrics, and agricultural wastes.

The cellulose nanofibers are included in the crosslinked polyolefin resin foam product preferably at a ratio of 1 mass % or more, more preferably at a ratio of 2 mass % or more, further preferably at a ratio of 3 mass % or more. The cellulose nanofibers are included in the crosslinked polyolefin resin foam product preferably at a ratio of 20 mass % or less, more preferably 16 mass % or less, further preferably 12 mass % or less.

More than half in the number of the cellulose nanofibers included in the crosslinked polyolefin resin foam product may be of a nano size, and not all of them need to be of a nano size. That is, the cellulose nanofibers do not need to be entirely of a nano size before being mixed with, for example, the high melting point polyolefin resin. In general, a plant is composed of plant fibers each having a diameter of 1 μm or more, and one of the plant fibers is constituted by a bundle of a plurality of cellulose nanofibers. The cellulose nanofibers before being dispersed in the crosslinked polyolefin resin foam product may be in such a bundle state. That is, the cellulose nanofibers may constitute bundles each having a diameter of about 10 to 100 μm before being dispersed in the crosslinked polyolefin resin foam product.

On the other hand, the cellulose nanofibers dispersed in the crosslinked polyolefin resin foam product preferably have an average fiber diameter of 1 nm or more and 400 nm or less. The average fiber diameter of the cellulose nanofibers dispersed in the crosslinked polyolefin resin foam product is more preferably 200 nm or less. The average length of the cellulose nanofibers is preferably about 10 times to 1000 times as large as the average fiber diameter thereof. The diameter and the length of the cellulose nanofibers in the crosslinked polyolefin resin foam product can be directly measured using a transmission electron microscope (TEM) or an atomic force microscope (AFM). More specifically, the average fiber diameter of the cellulose nanofibers can be determined by taking photos of a plurality of views using such a microscope as abovementioned, measuring the diameter of a plurality of (for example 50) fibers at randomly selected positions in the obtained images, and arithmetically averaging the obtained measured values. The average length of the cellulose nanofibers can be determined by randomly selecting a plurality of (for example 50) cellulose nanofibers of which the entire lengths can be measured in images captured by the transmission electron microscope (TEM) or the atomic force microfiber (AFM) in the same manner as in the average fiber dimeter, and measuring the lengths of the selected cellulose nanofibers. The average length can also be determined as an arithmetic average of the measured values, similar to the case of the average fiber diameter.

The cellulose nanofibers may be a modified product or a non-modified product, but are preferably hydrophobized by modification. As the hydrophobically modified cellulose nanofibers, for example, employed can be those cellulose nanofibers in which one or more of a plurality of hydroxy groups in the molecular structure of cellulose are substituted with a substituent including a hydrophobic group. Examples of the hydrophobic group include an alkyl group, an alkenyl group, an alkylene group, an alkenylene group, and an arylene group.

The hydrophobized cellulose nanofibers exhibit excellent affinity for the high melting point polyolefin resins, which are the main components of the crosslinked polyolefin resin foam product, and thus have an excellent reinforcing effect as compared with non-modified cellulose nanofibers. Further, the hydrophobized cellulose nanofibers exhibit excellent affinity for the high melting point polyolefin resins, and thus has an effect for suppressing coarse bubbles from being formed when the crosslinked polyolefin resin foam product is produced. A description is given in this regard. The crosslinked polyolefin resin foam product in this embodiment is generally produced by preparing an uncrosslinked resin composition that includes the high melting point polyolefin resins, the reinforcing material, and the softener and further includes a foaming agent and a crosslinking agent, and foaming and crosslinking the uncrosslinked resin composition. Thus, low affinity between the cellulose nanofibers and the high melting point polyolefin resins causes an aggregate of the cellulose nanofibers to be easily formed in the uncrosslinked resin composition, and further causes gases generated from the foaming agent to easily concentrate in an area where the aggregate is present, consequently causing the coarse bubbles to be easily formed. On the other hand, a crosslinked polyolefin resin foam product having fine bubbles and a low open cell ratio can be easily obtained by using the hydrophobized cellulose nanofibers.

The carbon nanofibers included in the crosslinked polyolefin resin foam product as the reinforcing material may be general carbon nanofibers each having a diameter of 10 nm or more and 500 nm or less, or may be those so called carbon nanotubes each having a diameter of less than 10 nm. The carbon nanofibers may have a linear structure, or may have a coiled structure. That is, the carbon nanofibers may be those so called carbon nanocoils. It is preferable that the carbon nanofibers included in the crosslinked polyolefin resin foam product have an average fiber diameter of 10 nm or more and 400 nm or less. The average fiber diameter of the carbon nanofibers is more preferably 200 nm or less. The average length of the carbon nanofibers is preferably about 10 to 1000 times as much as the average fiber diameter. The average fiber diameter and the average length of the carbon nanofibers can be measured in the same manner as in the average fiber diameter and the average length of the cellulose nanofibers.

The carbon nanofibers may be chemically modified. That is, the carbon nanofibers may have surfaces on which a hydroxy group or a carboxyl group is formed by, for example, a strong acid. Further, the carbon nanofibers may be further chemically modified using an organic compound having a functional group that can combine with the hydroxy group or the carboxyl group. For example, the carbon nanofibers may have an alkoxy group formed by condensation reaction of the hydroxyl group or the carboxyl group with an alcohol, in order to increase affinity for a polyolefin resin.

The crosslinked polyolefin resin foam product may further include an organic filler or an inorganic filler as a reinforcing material other than the cellulose nanofibers or the carbon nanofibers. Examples of the organic filler include resin powder. Examples of the inorganic filler include silicon oxide, aluminum oxide, aluminum hydroxide, magnesium hydroxide, calcium carbonate, magnesium carbonate, talc, clay, mica, graphite, and carbon black. In the case where the crosslinked polyolefin resin foam product includes a reinforcing material other than the cellulose nanofibers or the carbon nanofibers, the mass ratio of the reinforcing material other than the cellulose nanofibers or the carbon nanofibers to the crosslinked polyolefin resin foam product is preferably 1 mass % or more and 15 mass % or less.

The crosslinking agent and the foaming agent in this embodiment can be those used for producing a conventional crosslinked polyolefin resin foam product. The crosslinking agent may be, for example, an organic peroxide or an azo compound. In the case where a silane crosslinking-type polyolefin resin is used as the high melting point polyolefin resin, the crosslinking agent may be, for example, a silanol condensation catalyst.

Examples of the organic peroxide include dicumyl peroxide, di-t-butyl peroxide, 2,5-dimethyl-2,5-di-(t-butylperoxy)hexane, 2,5-dimethyl-2,5-di-(t-butylperoxy)hexyne-3, 1,3-bis(t-butylperoxyisopropyl)benzene, 1,1-bis(t-butylperoxy)-3,3,5-trimethylcyclohexane, n-butyl-4,4-bis(t-butylperoxy)valerate, benzoyl peroxide, p-chlorobenzoyl peroxide, 2,4-dichlorobenzoyl peroxide, t-butylperoxybenzoate, t-butylperoxyisopropyl carbonate, diacetyl peroxide, lauroyl peroxide, and t-butylcumyl peroxide.

Examples of the azo compound include azobisisobutyronitrile and azobis(2,4-dimethylvaleronitrile).

Examples of the silanol condensation catalyst include dibutyltin diacetate, dibutyltin dilaurate, dibutyltin dioctate, and dioctyltin dilaurate.

The crosslinking agent in this embodiment is preferably an organic peroxide.

In this embodiment, a crosslinking aid together with the crosslinking agent may be included in the uncrosslinked resin composition to adjust the crosslink density. Examples of the crosslinking aid include divinylbenzene, trimethylolpropane trimethacrylate, 1,6-hexanediol methacrylate, 1,9-nonanediol dimethacrylate, 1,10-decanediol dimethacrylate, trimellitic acid triallyl ester, triallyl cyanurate, triallyl isocyanurate, neopentyl glycol dimethacrylate, 1,2,4-benzenetricarboxylic acid triallyl ester, tricyclodecanedimethacrylate, and polyethylene glycol diacrylate.

Examples of the foaming agent include an azo compound such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4,4-trimethylpentane), 1,1'-azobis(cyclohexane-1-carbonitrile), or 2,2'-azobis[N-(2-carboxyethyl)-2-methyl-propionamidine]; a nitroso compound such as N,N'-dinitrosopentamethylenetetramine (DPT); a hydrazine derivative such as 4,4'-oxybis(benzenesulfonylhydrazide) or diphenylsulfone-3,3'-disulfonylhydrazide; a semicarbazide compound such as p-toluenesulfonyl semicarbazide; and an organic heat decomposable foaming agent such as trihydrazinotriazine.

The foaming agent may be, for example, a thermally decomposable inorganic foaming agent that can be: a bicarbonate such as sodium bicarbonate or ammonium bicarbonate or a carbonate such as sodium carbonate or ammonium carbonate; a nitrite such as ammonium nitrite; or a hydrogen compound.

In the case where the foaming agent is a thermally decomposable foaming agent as described above, the crosslinked polyolefin resin foam product may include, for example, a foaming aid such as a metal oxide-based foaming aid like zinc oxide, a urea-based foaming aid, a salicylic foaming aid, or a benzoic foaming aid.

The foaming agent may be, for example, an organic foaming agent of aliphatic hydrocarbons such as methanol, ethanol, propane, butane, pentane, or hexane, or an inorganic foaming agent such as air, carbon dioxide, nitrogen, argon, or water.

The crosslinked polyolefin resin foam product may further include various additives. For example, the crosslinked polyolefin resin foam product may appropriately include a weathering agent, a flame retardant, a pigment, a mold release agent, an antistatic agent, an antibacterial agent, a deodorizer, and the like. Further, the crosslinked polyolefin resin foam product may include a small amount of a polymer other than a polyolefin resin for the purpose of improved quality. Examples of the polymer other than the polyolefin resin that can be included in the crosslinked polyolefin resin foam product include a polyurethane-based polymer such as a polyester-based polyurethane or a polyether-based polyurethane; a styrene-based polymer such as styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-styrene-butadiene copolymer (SBSB), styrene-butadiene-styrene-butadiene-styrene copolymer (SBSBS), polystyrene, acrylonitrile styrene resin (AS resin), or acrylonitrile butadiene styrene resin (ABS resin); a fluorine-based polymer such as fluororesin and fluororubber; a polyamide-based polymer such as a polyamide-based resin or a polyamide-based elastomer, such as polyamide 6, polyamide 11, polyamide 12, polyamide 6,6, or polyamide 610; a polyester-based resin such as polyethylene terephthalate or polybutylene terephthalate; a silicone-based elastomer; butadiene rubber (BR); isoprene rubber (IR); chloroprene (CR); natural rubber (NR); styrene butadiene rubber (SBR); acrylonitrile butadiene rubber (NBR); or butyl rubber (IIR). It is preferable that the mass ratio of these polymers occupied in the crosslinked polyolefin resin foam product be 5 mass % or less. The content of these polymers in the crosslinked polyolefin resin foam product is more preferably 2 mass % or less, particularly preferably 1 mass %. It is most preferable that the crosslinked polyolefin resin foam product include no other polymer than the polyolefin resin.

The crosslinked polyolefin resin foam product can be produced by kneading the uncrosslinked resin composition including the components as described above to bring the entire uncrosslinked resin composition into a uniform state, followed by heating the obtained kneaded product to crosslink the high melting point polyolefin resins and the like and cause foaming with the foaming agent. For kneading the uncrosslinked resin composition, a common kneading apparatus such as an open roll or a kneader can be used. For crosslinking and foaming the uncrosslinked resin composition, a common heating apparatus such as a vacuum hot press can be used.

It is preferable that the uncrosslinked resin composition be crosslinked and foamed so that the average diameter of bubbles in the crosslinked polyolefin resin foam product to be produced is 10 μm to 1000 μm. The average diameter of bubbles in the crosslinked polyolefin resin foam product can be obtained by observing a cross section of the foam product using, for example, a microscope, determining the average cross-sectional area of the bubbles, and calculating the diameter of a circle having the area equal to this average cross-sectional area.

This crosslinking and foaming causes a plurality of cellulose nanofibers to be present inside a resin film forming each of the bubbles in the crosslinked polyolefin resin foam product. The cellulose nanofibers thereby cause the resin to exhibit high melt viscosity, and thus cause the resin film to have good elongation. Therefore, in the crosslinking and foaming, a crosslinked polyolefin resin foam product having a high closed cell ratio can be obtained. Further, even if the crosslinked polyolefin resin foam product is foamed until the film becomes sufficiently thin, the crosslinked polyolefin resin foam product can be excellent in lightweight properties and strength since the film is reinforced by the cellulose nanofibers.

Figure 2A:
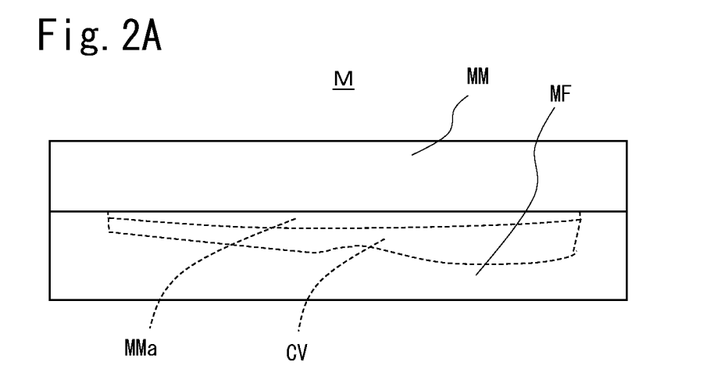
FIG. 2A is a schematic front view of a mold used for producing the midsole.
Figure 2B:
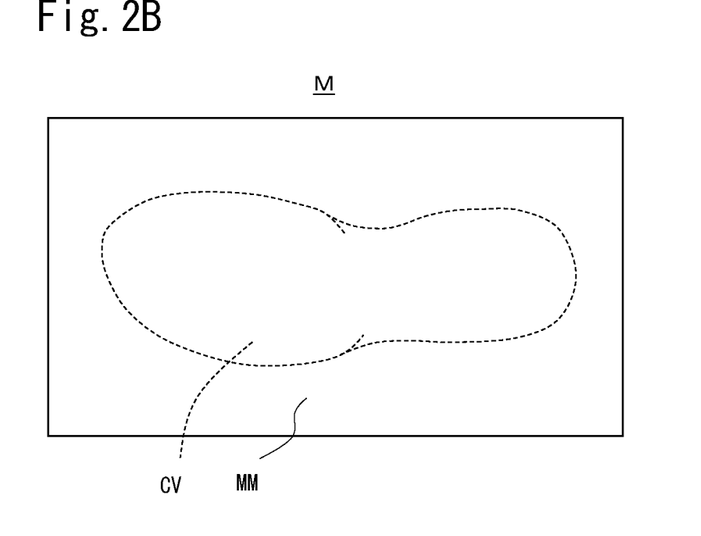
FIG. 2B is a schematic plan view of the mold used for producing the midsole.
Figure 2C:
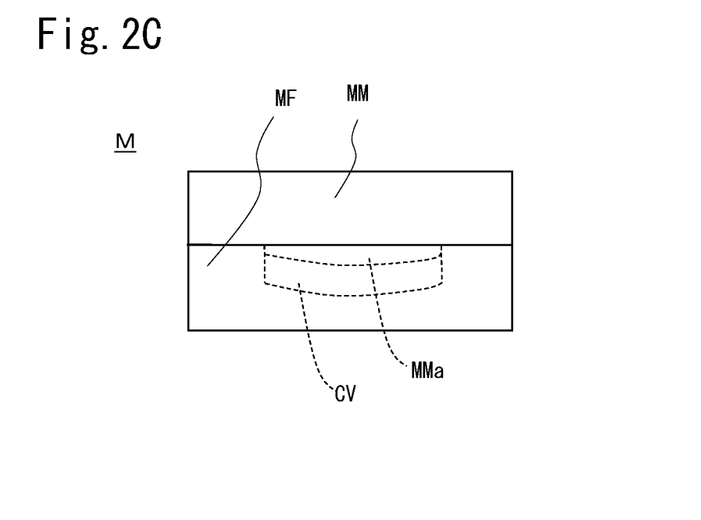
FIG. 2C is a schematic side view of the mold used for producing the midsole.
Figure 3:
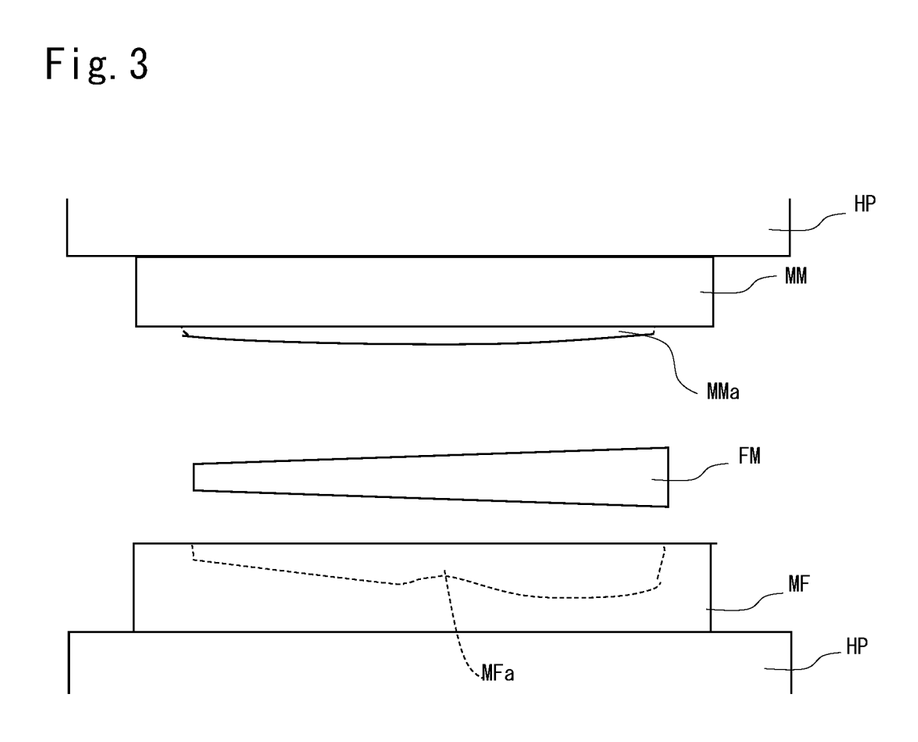
FIG. 3 is a schematic view showing a method for producing the midsole.

The midsole 3 of this embodiment can be produced using a forming mold M, as shown in FIG. 2A, FIG. 2B, FIG. 2C, and FIG. 3. FIG. 2A to FIG. 2C are respectively schematic views of the forming mold. FIG. 2A is a front view, FIG. 2B is a plan view, and FIG. 2C is a side view (a right side view). FIG. 3 is a view showing a state where the forming mold is mounted to a hot press.

As shown in the figures, the forming mold M is composed of a pair of molds respectively having molding surfaces that are opposed to and come into contact with each other when the forming mold M is closed. The forming mold M is configured to form a molding space CV inside thereof. The molding space CV has a shape conforming to the shape of the midsole 3 when the forming mold M is closed. The forming mold M has a male mold MM and a female mold MF as the pair of molds. Each of the male mold MM and the female mold MF in this embodiment has a plate shape. The forming mold M is configured to be able to form the tightly closed molding space CV inside thereof by joining the male mold MM and the female mold MF to each other.

The female mold MF has a molding recess MFa that is open on a side having the molding surface and recesses in a thickness direction of the female mold MF. The molding recess MFa is formed so that its depth direction corresponds to the thickness direction of the midsole 3. The male mold MM has a molding projection MMa that projects from the molding surface and can project into the molding recess MFa of the female mold MF. The forming mold M is configured to be able to form the molding space CV inside thereof in the state where the molding projection MMa is located at an intermediate position in the depth direction of the molding recess MFa when the female mold MF and the male mold MM join to each other. That is, the forming mold M is configured so that the molding space CV can be defined by an inner wall surface of a bottom portion of the molding recess MFa and a lower surface of the molding projection MMa. The inner wall surface of the female mold MF that defines the molding space CV has linear grooves each having a reverse shape of that of each corresponding one of the linear projections 3a, and rectangular projections each having a reverse shape of that of each corresponding one of the rectangular recesses 3b.

The midsole 3 of this embodiment is produced by a preliminary forming step of forming the crosslinked polyolefin resin foam product into a preformed product FM that is slightly thicker than the midsole 3, and a thermal molding step of subjecting the preformed product FM to thermal molding using the forming mold M to produce the midsole 3. In the preliminary forming step, the preformed product FM can be produced in such a manner as to cut a plate-shaped crosslinked polyolefin resin foam product larger than the midsole 3 and thicker than the midsole 3. In the thermal molding step, the midsole 3 can be produced in such a manner as to hot press the preformed product FM using the forming mold M. The thermal molding step can be performed by, for example, attaching the male mold MM and the female mold MF respectively to two hot plates HP of the hot press machine, as shown in the figures, placing the preformed product FM in the molding recess MFa, and closing the male mold MM and the female mold MF to apply pressure thereto and heat the preformed product FM. In the thermal molding step, pressure in the thickness direction applied to the preformed product FM generates lateral pressure between a side of the preformed product FM and a molding surface of the female mold MF. In the thermal molding step, the shapes of the linear grooves and the shapes of the rectangular projections are transferred to the preformed product FM by utilizing the lateral pressure, so that the midsole 3 having a side portion with the linear projections 3a and the rectangular recesses 3b formed therein is produced.

The preformed product FM of this embodiment is a foam product composed of a crosslinked polyolefin resin. That is, a resin film forming a bubble in the foam product constituting the preformed product FM is composed of a crosslinked polyolefin resin. Further, the resin film is reinforced by a plurality of cellulose nanofibers present in the film. Thus, the bubbles in the preformed product FM even if subjected to strong pressure in the thickness direction are less likely to be crushed. The preformed product FM of this embodiment therefore enables a large proportion of pressure applied thereto in the thickness direction to be converted to the lateral pressure. Further, the preformed product FM of this embodiment includes a softener such as a low melting point polyolefin resin. The preformed product FM of this embodiment therefore enables the shape of the female mold MF to be more precisely transferred to the side portion on which the female mold MF abuts. The preformed product FM of this embodiment has the shape of the female mold MF easily transferred thereto due to the softener, and can thus be formed into a desired shape without being subjected to high pressure in the thermal molding step.

Since the resin film forming each of the bubbles is reinforced by the cellulose nanofibers, the preformed product FM of this embodiment even at a high expansion ratio can exhibit strong repulsive force against the pressure applied in the thermal molding step. Since the preformed product FM can have, for example, the side portion formed into a desired shape without being subjected to high pressure, the high expansion ratio in the preformed product FM can be easily reflected also in the midsole 3 that has been molded. For such reasons, the midsole of this embodiment can exhibit excellent lightweight properties and strength. In this embodiment, the midsole of the present invention is exemplified as described above, but the midsole of the present invention is not limited to the abovementioned exemplification in any way.

EXAMPLES

Next, the present invention will be described in more detail by way of Examples, without limitation thereto.
(Cellulose Nanofiber Masterbatch (CNF-MB))

A masterbatch that includes linear low density polyethylene having a melting point of 114° C. (a high melting point polyolefin resin) and hydrophobically modified cellulose nanofibers, and has a content of the cellulose nanofibers (CNFs) of 40 mass % was prepared.
((A) High Melting Point Polyolefin Resin)

Apart from the high melting point polyolefin resin included in the CNF masterbatch, the following high melting point polyolefin resins as shown in (A1) to (A3) below were prepared:
(A1: PE-HD)
  High density polyethylene having a melting point of 134° C. and an MFR of 5.4 g/10 mins
(A2: PE-LLD)
  Linear low density polyethylene having a melting point of 117° C. and an MFR of 2.7 g/10 mins
(A3: EVA)
  Ethylene-vinyl acetate copolymer having a melting point of 77° C. and an MFR of 2.4 g/10 mins
(A4: PE-HD)
  Olefin-based block copolymer having a melting point of 120° C. and an MFR of 0.5 g/10 mins(ethylene-α olefin copolymer composed of constituent units derived from ethylene and 1-octene)

((B) Low Melting Point Polyolefin Resin)

A low melting point polyolefin resin shown in (B1) below was prepared.

(B1: E-AO)

Ethylene-α olefin copolymer having a melting point of 66° C. and an MFR of 1.2 g/10 mins ((C) Other Polymers)

As other polymers, the styrene-based thermoplastic elastomer shown in (C1) below and the isoprene rubber shown in (C2) were prepared.

(C1: TPS)

SEBS having a styrene content of 18 mass % and an MFR (230° C., 2.16 kg) of 4.5 g/10 mins (C2: IR)

High-cis polyisoprene rubber (98% cis 1,4 bond)

(Forming Crosslinked Polyolefin Resin Foam Product)

Polyolefin resin(s) and cellulose nanofiber masterbatch (CNF-MB) were blended at mixing ratios shown in the tables, and the obtained mixture to which a lubricant, a foaming agent (ADCA), a foaming aid (zinc oxide), a crosslinking agent (DCP), and a crosslinking aid (triallyl cyanurate: TAC) were added was heated, molten, and uniformly mixed, followed by being caused to foam in a mold to produce a plate-shaped crosslinked polyolefin resin foam product. Then, the specific gravity of the crosslinked polyolefin resin foam product was adjusted by the content of the foaming agent (ADCA). The values for the compound materials in the tables represent their parts by mass. The values for the mixing of the cellulose nanofiber masterbatch (Cel·NF-MB) and the carbon nanofiber masterbatch (Cbn·NF-MB) each represent the number of parts based on the total 100 parts by mass of the aforementioned (A) to (C). Further, the values for the mixing of the cellulose nanofibers (Cel·NF) and the carbon nanofibers (Cbn·NF) each represent the number of parts (based on the total 100 parts by mass of (A) to (C)) of the cellulose nanofibers or the carbon nanofibers added to the mixture as a result of addition of the cellulose nanofiber masterbatch (Cel·NF-MB) or the carbon nanofiber masterbatch (Cbn·NF-MB).

Evaluation (Hardness)

The Asker C hardness of each of the produced crosslinked polyolefin resin foam products was measured without their surface films being cut.

(Specific Gravity)

The specific gravity of each of the produced crosslinked polyolefin resin foam products was measured by "Underwater displacement" of JIS K 7112.

(Tear Strength)

The tear strength of each of the produced crosslink polyolefin resin foam products was measured according to JIS K 6252. Specific measurement conditions were as follows:

The crosslinked polyolefin resin foam product having a tear strength of 8.0 or more was deemed excellent in strength as a result of the measurement, and was thus judged as "A". The crosslinked polyolefin resin foam product having a tear strength of less than 8.0 was judged as "B".

<Conditions of Tear Strength Measurement>

Measuring instrument: Product name "STROGRAPH-R2" manufactured by Toyo Seiki Seisaku-sho, Ltd.

Shape of sample: Angle type test piece (unnicked) specified in JIS K 6252

Test speed: 500 mm/min (Elastic Modulus)

The compressive elastic modulus of each of the produced crosslinked polyolefin resin foam products was measured.

(Shapability)

The shapability of each of the produced crosslinked polyolefin resin foam products was visually evaluated. The evaluation was performed as follows:

The crosslinked polyolefin resin foam product having sharp edges was judged as "○", and that having no sharp edges was judged as "x".

The evaluation results are shown in the tables. In Comparative Example 7 and Comparative Example 11, an attempt was made to produce a crosslinked foam product having a specific gravity equivalent to that of each of Examples and other Comparative Examples using isoprene rubber, but consequently no foam product having an equivalent specific gravity was obtained. Therefore, in Comparative Example 7 and Comparative Example 11, no evaluation was performed for hardness and tear strength as in Examples and other Comparative Examples.

TABLE 1

| Material (Melting point (°C.)/MFR(g/10 mins)) | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| (A1)PE-HD (134/5.4) | 0 | ← | ← | 30 | ← | ← | 0 | ← | ← |
| (A2)PE-LLD (117/2.7) | 40 | ← | ← | 10 | ← | ← | 20 | ← | ← |
| (A3)EVA (77/2.4) | 20 | ← | ← | 20 | ← | ← | 20 | ← | ← |
| (A4) PE-HD (120/0.5) | 0 | ← | ← | 0 | ← | ← | 0 | ← | ← |
| (B1)E-AO (66/1.2) | 40 | ← | ← | 40 | ← | ← | 40 | ← | ← |
| (C1)TPS (—/4.5 *@230° C.) | 0 | ← | ← | 0 | ← | ← | 20 | ← | ← |
| (C2)IR | 0 | ← | ← | 0 | ← | ← | 0 | ← | ← |
| (X1) Subtotal | 100 | ← | ← | 100 | ← | ← | 100 | ← | ← |
| Cel · NF-MB(phr) | 15 | ← | ← | 15 | ← | ← | 15 | ← | ← |
| (Cel · NF(phr) | (6) | ← | ← | (6) | ← | ← | (6) | ← | ← |
| Cbn · NF-MB(phr) | 0 | ← | ← | 0 | ← | ← | 0 | ← | ← |
| (Cbn · NF(phr)) | (0) | ← | ← | (0) | ← | ← | (0) | ← | ← |
| (X2) Total | 115 | ← | ← | 115 | ← | ← | 115 | ← | ← |
| Specific gravity | 0.12 | 0.15 | 0.19 | 0.12 | 0.15 | 0.20 | 0.12 | 0.15 | 0.18 |
| Asker C hardness (°) | 50 | 58 | 65 | 58 | 64 | 75 | 44 | 52 | 60 |
| Compressive elastic modulus (MPs) | 2.0 | 3.2 | 4.6 | 3.0 | 4.5 | 8.0 | 1.6 | 2.1 | 3.3 |
| Tear strength (N/mm) | 8.5 | 9.4 | 11.3 | 9.5 | 10.9 | 14.3 | 8.1 | 8.4 | 10.0 |
| [Judgement] | A | A | A | A | A | A | A | A | A |
| Shapability | ○ | ○ | ○ | ○ | ○ | ○ | ○ | ○ | ○ |

TABLE 2

| Material (Melting point (° C.)/MFR(g/10 mins)) | Ex. 10 | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|---|
| (A1)PE-HD (134/5.4) | 0 | ← | ← | 20 | ← | ← | 0 | 0 | 0 | 0 |
| (A2)PE-LLD (117/2.7) | 20 | ← | ← | 20 | ← | ← | 60 | 60 | 40 | 20 |
| (A3)EVA (77/2.4) | 30 | ← | ← | 20 | ← | ← | 0 | 0 | 20 | 20 |
| (A4) PE-HD (120/0.5) | 20 | ← | ← | 20 | ← | ← | 0 | 0 | 0 | 0 |
| (B1)E-AO (66/1.2) | 30 | ← | ← | 20 | ← | ← | 40 | 40 | 40 | 40 |
| (C1)TPS (—/4.5 *@230° C.) | 0 | ← | ← | 0 | ← | ← | 0 | 0 | 0 | 20 |
| (C2)IR | 0 | ← | ← | 0 | ← | ← | 0 | 0 | 0 | 0 |
| (X1) Subtotal | 100 | ← | ← | 100 | ← | ← | 100 | 100 | 100 | 100 |
| Cel · NF-MB(phr) | 15 | ← | ← | 15 | ← | ← | 4 | 30 | 0 | 0 |
| (Cel · NF(phr) | (6) | ← | ← | (6) | ← | ← | (1.6) | (12) | (0) | (0) |
| Cbn · NF-MB(phr) | 0 | ← | ← | 0 | ← | ← | 0 | 0 | 15 | 15 |
| (Cbn · NF(phr) | (0) | ← | ← | (0) | ← | ← | (0) | (0) | (6) | (6) |
| (X2) Total | 115 | ← | ← | 115 | ← | ← | 104 | 130 | 115 | 115 |
| Specific gravity | 0.13 | 0.16 | 0.19 | 0.10 | 0.14 | 0.19 | 0.14 | 0.15 | 0.12 | 0.12 |
| Asker C hardness (°) | 47 | 55 | 63 | 57 | 65 | 76 | 59 | 66 | 53 | 45 |
| Compressive elastic modulus (MPs) | 1.9 | 2.6 | 3.9 | 2.7 | 4.5 | 8.2 | 3.1 | 4.9 | 2.3 | 1.7 |
| Tear strength (N/mm) | 8.0 | 8.9 | 10.9 | 8.8 | 11.9 | 15.7 | 9.4 | 12.0 | 8.6 | 8.1 |
| [Judgement] | A | A | A | A | A | A | A | A | A | A |
| Shapability | ○ | ○ | ○ | ○ | ○ | ○ | ○ | ○ | ○ | ○ |

TABLE 3

| Material (Melting point (° C.)/MFR(g/10 mins)) | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| (A1)PE-HD (134/5.4) | 0 | 0 | 100 | 0 | 0 | 0 | 0 |
| (A2)PE-LLD (117/2.7) | 40 | 0 | 0 | 100 | 100 | 0 | 0 |
| (A3)EVA (77/2.4) | 20 | 60 | 0 | 0 | 0 | 100 | 0 |
| (A4) PE-HD (120/0.5) | | | | | | | |
| (B1)E-AO (66/1.2) | 40 | 40 | 0 | 0 | 0 | 0 | 0 |
| (C1)TPS (—/4.5 *@230° C.) | 0 | 0 | 0 | 0 | 0 | 0 | 0 |
| (C2)IR | 0 | 0 | 0 | 0 | 0 | 0 | 100 |
| (X1) Subtotal | 100 | 100 | 100 | 100 | 100 | 100 | 100 |
| Cel · NF-MB(phr) | 0 | 0 | 15 | 15 | 4 | 15 | 15 |
| (Cel · NF(phr) | (0) | (0) | (6) | (6) | (1.6) | (6) | (6) |
| Cbn · NF-MB(phr) | 0 | 0 | 0 | 0 | 0 | 0 | 0 |
| (Cbn · NF(phr)) | (0) | (0) | (0) | (0) | (0) | (0) | (0) |
| (X2) Total | 100 | 100 | 115 | 115 | 104 | 115 | 115 |
| Specific gravity | 0.12 | 0.12 | 0.12 | 0.12 | 0.13 | 0.12 | — |
| Asker C hardness (°) | 48 | 40 | 70 | 60 | 58 | 45 | — |
| Compressive elastic modulus (MPs) | 1.8 | 0.8 | 4.2 | 3.2 | 2.6 | 1.4 | — |
| Tear strength (N/mm) | 7.5 | 7 | 12 | 10 | 9.8 | 6.5 | — |
| [Judgement] | B | B | A | A | A | B | — |
| Shapability | x | ○ | x | x | x | ○ | — |

TABLE 4

| Material (Melting point (° C.)/MFR(g/10 mins)) | C. Ex. 8 | C. Ex. 9 | C. Ex. 10 | C. Ex. 11 |
|---|---|---|---|---|
| (A1)PE-HD (134/5.4) | 100 | 0 | 0 | 0 |
| (A2)PE-LLD (117/2.7) | 0 | 100 | 0 | 0 |
| (A3)EVA (77/2.4) | 0 | 0 | 100 | 0 |
| (A4) PE-HD (120/0.5) | | | | |
| (B1)E-AO (66/1.2) | 0 | 0 | 0 | 0 |
| (C1)TPS (–/4.5 *@230° C.) | 0 | 0 | 0 | 0 |
| (C2)IR | 0 | 0 | 0 | 100 |
| (X1) Subtotal | 100 | 100 | 100 | 100 |
| Cel · NF-MB(phr) | 0 | 0 | 0 | 0 |
| (Cel · NF(phr) | (0) | (0) | (0) | (0) |
| Cbn · NF-MB(phr) | 15 | 15 | 15 | 15 |
| (Cbn · NF(phr)) | (6) | (6) | (6) | (6) |
| (X2) Total | 115 | 115 | 115 | 115 |
| Specific gravity | 0.13 | 0.11 | 0.13 | — |
| Asker C hardness (°) | 72 | 63 | 46 | — |
| Compressive elastic modulus (MPs) | 4.3 | 3.5 | 1.5 | — |
| Tear strength (N/mm) | 12.1 | 9.9 | 6.8 | — |
| [Judgement] | A | A | B | — |
| Shapability | x | x | ○ | — |

It is evident from the aforementioned description that, according to the present invention, a midsole excellent in lightweight properties and strength is provided.

REFERENCE SIGNS LIST

1: Shoe
3: Midsole
4: Outsole

The invention claimed is:

1. A midsole for a shoe, the midsole comprised of a crosslinked polyolefin resin foam product, wherein
the crosslinked polyolefin resin foam product comprises one or more high melting point polyolefin resins each having a melting point of more than 75° C.;
a softener comprising a crystalline resin having a melting point of from 40° C. to 75° C. or an amorphous resin having a glass transition temperature of from 40° C. to 75° C.; and
a reinforcing material comprising cellulose nanofibers or carbon nanofibers.

2. The midsole according to claim 1, wherein
the crystalline resin is a low melting point polyolefin resin having a melting point of from 40° C. to 75° C.,
a mass ratio of the low melting point polyolefin resin is from 20 mass % to 40 mass % based on a total of the low melting point polyolefin resin and the one or more high melting point polyolefin resins.

3. The midsole according to claim 2, wherein
the low melting point polyolefin resin has a melting point of more than 45° C.,
the one or more high melting point polyolefin resins in the crosslinked polyolefin resin foam product have a melting point that is 30° C. or more higher than the melting point of the low melting point polyolefin resin.

4. The midsole according to claim 1, wherein
a mass ratio of the cellulose nanofibers in the crosslinked polyolefin resin foam product is from 3 mass % to 10 mass %.

5. The midsole according to claim 1, further comprising:
a side portion constituting an outer surface of the shoe, wherein
the side portion comprises a plurality of projections or a plurality of recesses.

6. A shoe comprising the midsole according to claim 1.

7. The midsole according to claim 2, wherein
a mass ratio of the cellulose nanofibers in the crosslinked polyolefin resin foam product is from 3 mass % to 10 mass %.

8. The midsole according to claim 3, wherein
a mass ratio of the cellulose nanofibers in the crosslinked polyolefin resin foam product is from 3 mass % to 10 mass %.

9. The midsole according to claim 2, further comprising:
a side portion constituting an outer surface of the shoe, wherein
the side portion comprises a plurality of projections or a plurality of recesses.

10. The midsole according to claim 3, further comprising:
a side portion constituting an outer surface of the shoe, wherein
the side portion comprises a plurality of projections or a plurality of recesses.

11. The midsole according to claim 4, further comprising:
a side portion constituting an outer surface of the shoe, wherein
the side portion comprises a plurality of projections or a plurality of recesses.

12. The midsole according to claim 7, further comprising:
a side portion constituting an outer surface of the shoe, wherein
the side portion comprises a plurality of projections or a plurality of recesses.

13. The midsole according to claim 8, further comprising:
a side portion constituting an outer surface of the shoe, wherein
the side portion comprises a plurality of projections or a plurality of recesses.

14. A shoe comprising the midsole according to claim 2.
15. A shoe comprising the midsole according to claim 3.
16. A shoe comprising the midsole according to claim 4.
17. A shoe comprising the midsole according to claim 5.
18. A shoe comprising the midsole according to claim 7.
19. A shoe comprising the midsole according to claim 8.
20. A shoe comprising the midsole according to claim 9.

* * * * *